(12) United States Patent
Kiest, Jr.

(10) Patent No.: US 9,849,625 B2
(45) Date of Patent: Dec. 26, 2017

(54) TEMPERATURE SENSING WITHIN AN UNDERGROUND STRUCTURE TO DETERMINE LINER CURE SCHEDULE

(75) Inventor: Larry W. Kiest, Jr., Ottawa, IL (US)

(73) Assignee: LMK Technologies LLC, Ottawa, IL (US)

( * ) Notice: Subject to any disclaimer, the term of this patent is extended or adjusted under 35 U.S.C. 154(b) by 540 days.

(21) Appl. No.: 13/548,293

(22) Filed: Jul. 13, 2012

(65) Prior Publication Data
US 2014/0015155 A1    Jan. 16, 2014

(51) Int. Cl.
| B29C 63/34 | (2006.01) |
| B29C 63/00 | (2006.01) |
| F16L 55/165 | (2006.01) |

(52) U.S. Cl.
CPC ...... B29C 63/0004 (2013.01); B29C 63/0069 (2013.01); B29C 63/34 (2013.01); F16L 55/1654 (2013.01)

(58) Field of Classification Search
CPC ............... B29C 63/0004; B29C 63/34; B29C 63/0069; F16L 55/1654
See application file for complete search history.

(56) References Cited

U.S. PATENT DOCUMENTS

| 5,453,226 A * | 9/1995 | Kline et al. ............... 264/40.1 |
| 5,527,169 A * | 6/1996 | Goldenberg et al. ........... 425/11 |
| 6,050,300 A | 4/2000 | Schwert et al. |
| 6,942,426 B1 * | 9/2005 | Kampbell et al. ......... 405/184.2 |
| 2004/0251575 A1 * | 12/2004 | St. Onge et al. ............. 264/162 |
| 2006/0137816 A1 * | 6/2006 | Taylor et al. ................. 156/294 |
| 2011/0030875 A1 * | 2/2011 | Conte .................... G01V 15/00 156/64 |
| 2012/0147920 A1 | 6/2012 | Glombitza |

FOREIGN PATENT DOCUMENTS

| JP | 10193457 A * | 7/1998 | ............. B29C 63/34 |
| WO | WO 2004/020893 A1 | 3/2004 | |

OTHER PUBLICATIONS

Chin et al., "Development of the Trenchless Rehabilitation Process for Underground Pipes Based on RTM", 2005, Composite Structures, vol. 68, pp. 267-282.*

(Continued)

*Primary Examiner* — Yogendra Gupta
*Assistant Examiner* — Ninh Le
(74) *Attorney, Agent, or Firm* — Nyemaster Goode, P.C.

(57) ABSTRACT

The invention utilizes temperature sensing to measure the internal temperature of an underground structure, such as a pipe, for the purpose of determining a proper cure interval and/or mix ratio of a resin system during a lining operation. A temperature sensor is placed within a pipe or other underground structure to be rehabilitated and at least one temperature measurement is taken within the structure prior to or simultaneously with the installation of a liner. Once the temperature of an internal aspect of the structure is taken, a cure schedule is utilized to determine the appropriate curing time based on test data obtained from baseline tests performed under simulated conditions in a soil cell apparatus. A computer program may be utilized such that upon entering the type of resin, the lowest recorded temperature of the structure, and the initial resin temperature, a cure schedule is supplied.

14 Claims, 4 Drawing Sheets

(56) References Cited

OTHER PUBLICATIONS

Woo Seok Chin & D. Lee, "Trenchless Repairing of Underground Pipes Using RTM & Dielectrometry", Oct. 29, 2015, Research Gates, pp. 4-5.*

LMK Technologies, LLC, PCT/US2013/049664 filed Jul. 9, 2013, "Notification of Transmittal of The International Search Report and The Written Opinion of The International Searching Authority, or The Declaration" dated Oct. 8, 2013.

* cited by examiner

TEMPERATURE SENSING WITHIN AN UNDERGROUND STRUCTURE TO DETERMINE LINER CURE SCHEDULE

FIELD OF THE INVENTION

The present invention relates generally to the repair of underground structures. More particularly, but not exclusively, the invention relates to a system, apparatus, and method for determining proper curing characteristics for repairing the structure.

BACKGROUND OF THE INVENTION

As the infrastructure of modern nations continues to age, many rehabilitation methods have been developed to minimize the need to fully replace the existing infrastructure. Such methods are usually cost effective options that decrease any disruption in traffic or lifestyle caused by replacing existing structures. For example, the cured-in-place pipelining method of pipe rehabilitation has been known as a viable option for infrastructure repair or rehabilitation. The method involves impregnating a fabric liner with a resin capable of curing and hardening, placing the liner against the interior of a pipe to be repaired, applying fluid pressure to the liner, and allowing the resin to cure and harden. The result is an existing pipe having an inner lining that provides sealing capabilities and structural reinforcement. Other methods that have been used for similar purposes include spray-on lining, grouting, and fold-and-form lining.

Many different resin systems are known to be acceptable for use in cured-in-place pipe lining and other applications for repairing underground structures. Most applications utilize thermoset resins. For instance, many known cured-in-place pipelining systems utilize epoxy, polyurethane, vinyl ester, or polyester resins. Thermoset resins are used for such applications for a variety of reasons, including the ease and flexibility of the lining process, the availability of a range of materials to provide substantial reinforcement within the existing pipe, and the relatively low cost of materials.

Thermoset resins may be formulated to cure under ambient conditions or under the application of heat. Both types of formulations have been used previously in cured-in-place pipelining applications. However, the use of such thermoset resins creates several problems during installation. The primary problem observed in the field is uncertain cure times due to ambient conditions. Since thermoset resins are generally formulated to cure in a specified time range under a set of specified environmental conditions, it is difficult to ensure that those conditions exist in the field. Even if the ranges of conditions that allow the resin to cure exist, there is still an uncertainty as to precisely how long the cure will take. This uncertainty leads to loss of production by an installer, inefficient use of labor and capital, and an increased risk of liner installation failure. These problems are exacerbated when using ambient cure resin systems, because an operator usually has no way of facilitating resin cure if ideal conditions are not met, such as by the application of additional heat. Therefore, there is a need in the art to address the deficiencies associated with the use of thermoset resin systems in cured-in-place pipe lining applications.

SUMMARY OF THE INVENTION

The present invention utilizes temperature sensing to measure the internal temperature of an underground structure, such as a pipe, for the purpose of determining a proper cure interval and/or mix ratio of a resin system during a lining operation. More particularly, a temperature sensor is placed within a pipe or other underground structure to be rehabilitated and at least one temperature measurement is taken within the structure prior to or simultaneously with the deployment of a liner. After the temperature of an internal aspect of the pipe is taken, a cure schedule is utilized to determine the appropriate curing time based on test data obtained from baseline tests performed under simulated conditions in a soil cell apparatus. A computer program may be utilized that upon entering the type of resin, the lowest recorded temperature of the structure, and the initial resin temperature, a cure schedule will be supplied to the user of the program.

Another aspect of the invention includes the compilation of data using a soil cell that simulates in-ground conditions. The data gathered from the soil cell simulations is analyzed to determine a proper cure time or mix ratio of the ambient cure resin system based on the in-ground temperature of a pipe. The analyzed data is presented in a format that a cured-in-place pipe liner installer may use to determine the expected cure time of a resin using a specified mix ratio of resin.

Another aspect of the invention includes an apparatus for determining the temperature of the internal aspects of a pipe or other underground structure. The apparatus includes a temperature probe, a member adapted to transport the temperature probe to a location remote to an operator, and means for providing the temperature information to the operator or other user. The temperature probe may be a liquid or gas thermometer, a thermal radiation thermometer, a laser thermometer, a pyrometer, a thermocouple, a resistance thermometer, or any other component capable of measuring the temperature of the conditions within a pipe or other underground structure. The member adapted to transport the temperature probe to a location remote to a user may be a rod made of fiberglass or similar materials, a robot, an unmanned aerial vehicle ("UAV"), a pipeline inspection gauge ("PIG"), a flexible reinforced conduit, a cable, or the like. The temperature probe should be attached or otherwise connected to the member adapted to transport the temperature probe to a location remote to a user. However, since a user may be remote from the area where the temperature reading will take place, a means for providing the temperature information to the user may be utilized. The means for providing the temperature information to the user may include a camera, a wire, a wireless transmitter/receiver, a cellular phone, a terminal for viewing the temperature information, or a combination of the foregoing.

Yet another aspect of the invention includes performing a plurality of temperature measurements within a pipe and determining a cure schedule for an ambient-cure resin system based on the lowest observed temperature reading. The temperature readings may be taken of the ambient air within the pipe and any fluid flowing through the pipe, but it is preferred to take a plurality of temperature readings of the internal walls of the pipe over the length of the pipe to be lined.

DETAILED DESCRIPTION OF THE PREFERRED EMBODIMENTS

The present invention is directed towards methods and apparatuses for determining a proper cure interval and/or mix ratio of a resin system during a pipe lining operation. The illustrated embodiments are described primarily in reference to ambient cure resin systems, but the embodiments described also provide the same advantages using any other thermoset resin system. The illustrated embodiments are also described primarily in reference to sewer pipes. However, other pipes and/or conduits are intended to be within the scope of this invention, including but not limited to manholes, gravity pipes, pressure pipes, water pipes, and oil/gas pipes. The illustrated embodiments further show where the pipe lining operation utilized is a cured-in-place pipelining operation. However, it should be understood that the use of other types of pipe liners are within the scope of this invention. For example, various pipe liners may be used, including but not limited to a cured-in-place liner, a molded-in-place liner, or a spray-on liner.

Figure 1:
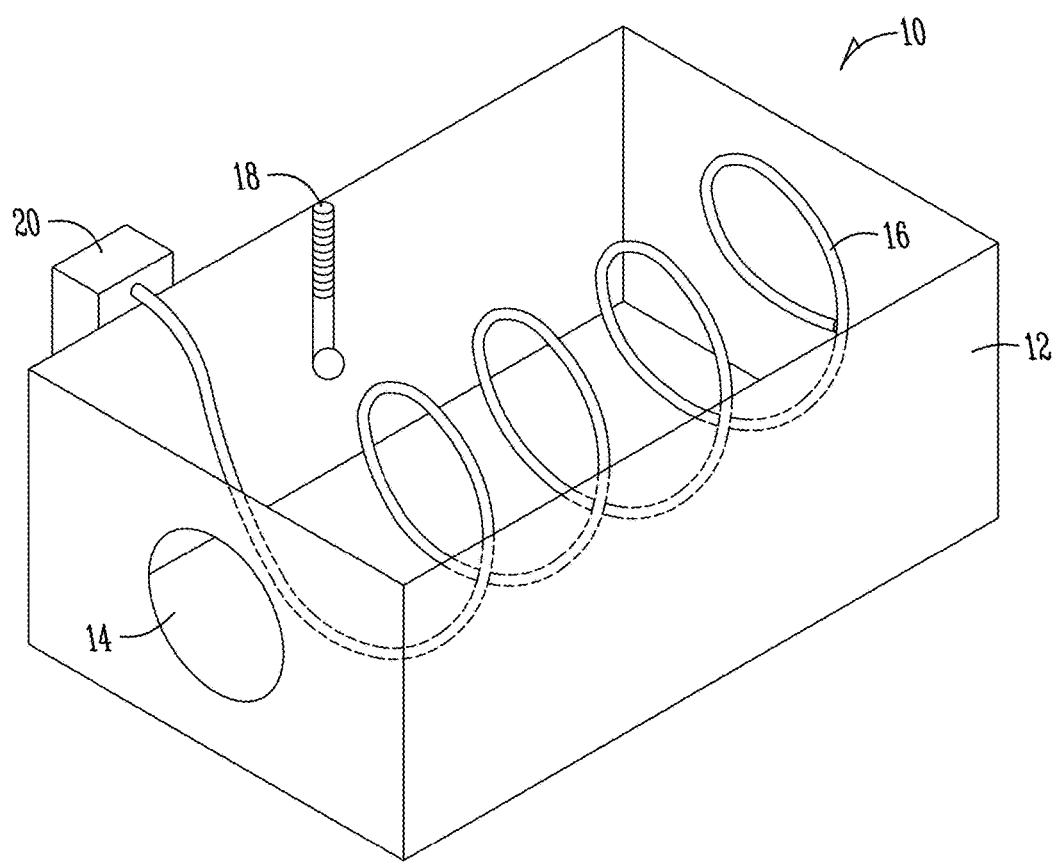
FIG. 1 is a perspective view of a soil cell for use in accordance with the present invention.

Referring now to the drawings, wherein like numerals refer to like parts, FIG. 1 is a soil cell 10 for determining a resin cure schedule having variable ambient temperatures. The soil cell includes a housing 12 capable of holding a media having at least one receiving aperture 14 for a pipe or other structure, a heat exchanger 16 for adjusting the surrounding temperature of the pipe, a temperature sensor 18, and an optional control module 20 for adjusting the temperature of the surrounding media. The housing 12 may be a constructed of a metallic, polymeric, or composite material that is formed into a structure capable of holding a media, depicted in FIG. 1 as a rectangular form. The receiving aperture 14 depicted in FIG. 1 is shown as being sized to accept a pipe having an outer diameter of about 6 inches, but the receiving aperture 14 and housing 12 may be configured to allow any size pipe or other structure to be placed within the housing 12. The heat exchanger 16 for adjusting the surrounding temperature of the pipe is depicted as a hollow coil capable of receiving and circulating a heated or cooled fluid therethrough. Alternatively, the heat exchanger 16 for adjusting the surrounding temperature of the pipe could be a climate controlled room or enclosure. The temperature sensor 18 is depicted as a glass thermometer that is positioned within the housing so as to be surrounded by the media, while still allowing an operator to visually read the temperature. Alternatively, the temperature sensor 18 may be a thermal radiation thermometer, a laser thermometer, a pyrometer, a thermocouple, a resistance thermometer, or any other component capable of measuring the temperature of the media surrounding the pipe and conveying the temperature data to an operator. The control module 20 allows an operator or user to control the function of the heat exchanger 16, i.e. the temperature of the soil cell. Preferably, the temperature sensor 18 and the heat exchanger 16 are disposed in electronic communication with the control module 20 for maintaining the media at a desired temperature. Examples of control modules acceptable for use with the soil cell may be found in U.S. Pat. Nos. 3,354,944; 6,302,966; or 6,446,508; and in U.S. Patent Application Publication Number 2005/0081441.

Figure 2:
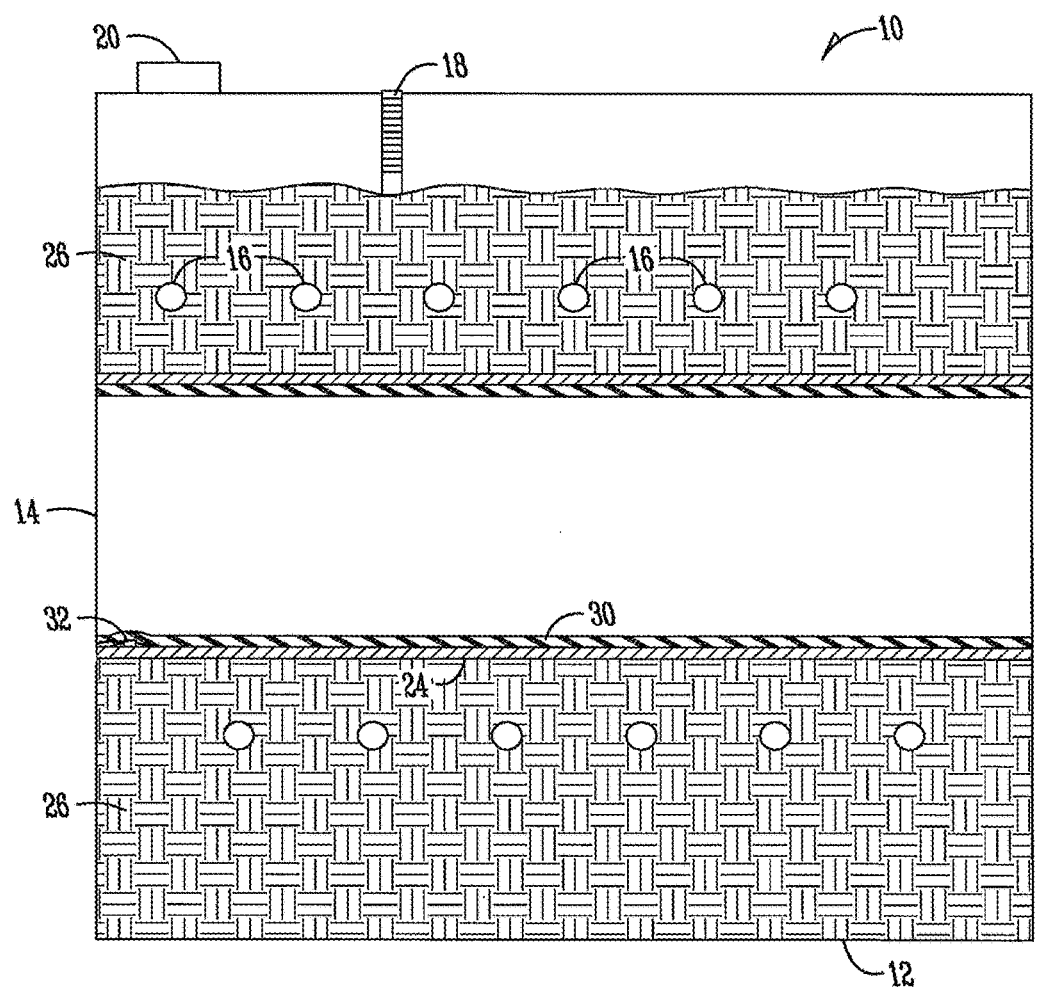
FIG. 2 is a sectional view of a soil cell as shown in FIG. 1 having a pipe and liner installed in accordance with the present invention.

In operation, a pipe 24 or other structure to be lined is placed within the receiving aperture 14 of the soil cell 10 as shown in FIG. 2. Once the pipe 24 is positioned within the housing 12, it is sealed at the receiving aperture 14 utilizing a gasket, gland, band, sealant, or other means of sealing. The housing is then filled with media 26. The media 26 may be any media found surrounding an underground pipe or other structure. For instance, the media 26 may be sand, soil, water, rock, clay, or some combination thereof. After the housing 12 is filled with the media 26, the heat exchanger 16 is activated to adjust the temperature of the pipe 24 and surrounding media 26 until the temperature of the surrounding media 26 has reached a desired level. The starting temperatures of the media 26 and the internal aspect of the pipe 24 are measured and recorded. A pipe liner 30 is then impregnated with an ambient cure resin, the initial temperature of the mixed resin and the temperature of the pipe liner 30 are measured and recorded using a second temperature sensor 32, the pipe liner 30 is placed against the inner wall of the pipe 24, and the start time of the data observation is recorded. Second temperature sensor 32 should be adapted to measure the temperature of the resin or pipe liner 30 before and during the cure interval.

Second temperature sensor 32 is depicted as a thermocouple having a wire integrated into the pipe liner 30, but the second temperature sensor 32 may be a thermal radiation thermometer, a laser thermometer, a pyrometer, a thermocouple, a resistance thermometer, or any other component capable of measuring the temperature of the resin or pipe liner 30 and conveying the temperature data to an operator. The second temperature sensor can also be a wireless sensor to convey the temperature to outside of the soil cell 10. If desired, the heat exchanger 16 may be placed into an off position via the control module 20 at the start time to allow any heat released during the polymerization reaction to affect the temperature of the media 26. As the resin cures, temperature data of both the surrounding media 26 and the pipe liner 30 are recorded. At some point during the resin curing process, an exothermic peak temperature will be observed at or near the height of the chemical reaction between the resin and catalyst. Around the time of this peak exothermic temperature, the resin cure is assumed to occur.

To further confirm that the resin in the pipe liner 30 has fully cured, a barcol impressor, shore hardness tester, or other hardness testing apparatus may be utilized to take tests of the hardness of the resin. The barcol impressor or other hardness tester may be portable or small in size to fit inside of the pipe 24 being tested. Hardness measurements are taken once every one to three minutes, but it is preferred to compile as much data as possible, so shorter periods may be utilized. Once the hardness of the resin has reached the specified hardness of the final cured product, the pipe liner 30 can be definitively characterized as fully cured.

An example of the data recorded in accordance with the method above is found in Table I. In the example found in Table I, a thermosetting resin was tested by the method above using the soil cell apparatus 10. The thermosetting resin was an ambient cure epoxy resin formulated to fully cure within 60-70 minutes at 70° Fahrenheit at a mix ration of 2 to 1 epoxy resin to amine hardener. The resin was mixed, applied to a pipe liner 30, and inserted into the soil cell apparatus 10 in the manner described above. The internal pipe temperature was taken prior to insertion of the pipe liner 30. The temperature of the media was held constant by the control module 20. It should be noted that any other resin system could be used in this embodiment, including but not limited to polyester, polyurea, polyurethane, acrylic, or composite resins. It should also be understood that the components of the resin system would vary based on the chemistry of the resin system. For example, a polyester resin system will differ from a two-part epoxy system by usually having three components: the ester base resin, a promoter, and a catalyst. The mix ratios of each component may be varied, and the chemical reaction may be accelerated or delayed. As a result, the cure schedule will vary in such systems when the mix ratios are altered significantly.

TABLE I

Testing of Epoxy Resin A having a mix ratio of 2-parts epoxy to 1-part amine hardener, a cured hardness of 80B, and ambient cure schedule of 60-70 minutes at 70 Deg. Fahrenheit

| Time (Min.) | Internal Temperature of pipe (° F.) | Temperature of Media (° F.) | Temperature of resin/pipe liner (° F.) | Barcol Hardness of Pipe Liner (B) |
|---|---|---|---|---|
| 0 | 50.0 | 50.0 | 60.5 | n/a |
| 10 | n/a | 50.0 | 60.6 | n/a |
| 20 | n/a | 50.0 | 60.8 | n/a |
| 30 | n/a | 50.0 | 61.0 | n/a |
| 40 | n/a | 50.0 | 61.0 | n/a |
| 45 | n/a | 50.0 | 63.5 | n/a |
| 50 | n/a | 50.0 | 64.2 | 35 |
| 55 | n/a | 50.0 | 65.0 | 37 |
| 60 | n/a | 50.0 | 65.1 | 39 |
| 65 | n/a | 50.0 | 65.4 | 41 |
| 70 | n/a | 50.0 | 65.8 | 43 |
| 75 | n/a | 50.0 | 65.2 | 62 |
| 80 | n/a | 50.0 | 64.9 | 72 |
| 85 | n/a | 50.0 | 64.5 | 80 |
| 90 | n/a | 50.0 | 64.0 | 80 |

As shown by the data presented in Table I, full cure of the ambient-cure epoxy resin system tested occurs approximately 85 minutes after mixing of the resin and placement within a pipe having an initial internal temperature of 50° F., and an initial resin temperature of approximately 60° F. This time range was observed in spite of the epoxy being formulated to cure within a 60-70 minute range. The methods described and reported in Table I should be repeated to achieve statistical significance and to simulate a full range of pipe temperatures, resin systems, mix ratios, and pipe liner temperatures.

Table II provides a second example of the data recorded in accordance with the methods of the present embodiment. In Table II, a polyester resin system comprising three components was tested. The components were mixed together according to the manufacturer's specification: the ester base resin 97.8% by weight, benzoyl peroxide (BPO) as a promoter 2% by weight, and dimethylaniline (DMA) as a catalyst in 0.2% by weight.

TABLE II

Testing of Polyester Resin B having a mix ratio of ester base resin 97.8% by weight, BPO as a promoter 2% by weight, and DMA as a catalyst 0.2% by weight; a cured hardness of 75B and ambient cure schedule of 80-90 minutes at 70 Deg. Fahrenheit

| Time (Min.) | Internal Temperature of pipe (° F.) | Temperature of Media (° F.) | Temperature of resin/pipe Liner (° F.) | Barcol Hardness of Pipe Liner (B) |
|---|---|---|---|---|
| 0 | 60.0 | 60.0 | 65.0 | n/a |
| 10 | n/a | 60.0 | 65.3 | n/a |
| 20 | n/a | 60.0 | 65.6 | n/a |
| 30 | n/a | 60.0 | 65.9 | n/a |
| 40 | n/a | 60.0 | 66.0 | n/a |
| 45 | n/a | 60.0 | 66.5 | n/a |
| 50 | n/a | 60.0 | 66.2 | n/a |
| 55 | n/a | 60.0 | 67.0 | n/a |
| 60 | n/a | 60.0 | 68.1 | n/a |
| 65 | n/a | 60.0 | 68.4 | n/a |
| 70 | n/a | 60.0 | 68.8 | n/a |
| 75 | n/a | 60.0 | 69.2 | 35 |
| 80 | n/a | 60.0 | 69.7 | 47 |
| 85 | n/a | 60.0 | 69.9 | 58 |
| 90 | n/a | 60.0 | 70.3 | 65 |
| 95 | n/a | 60.0 | 70.6 | 72 |
| 100 | n/a | 60.0 | 70.5 | 75 |
| 105 | n/a | 60.0 | 70.3 | 75 |
| 110 | n/a | 60.0 | 70.1 | 75 |

As shown by the data presented in Table II, full cure of the ambient-cure polyester resin system tested occurs approximately 100 minutes after placement within a pipe having an initial internal temperature of 60° F. and an initial pipe liner temperature of approximately 65° F. This time range was observed in spite of the polyester being formulated to cure within an 80-90 minute range. As in Table I, the methods described and reported in Table II should be repeated to achieve statistical significance and to simulate a full range of pipe temperatures, resin systems, mix ratios, and resin or pipe liner temperatures.

Once a complete data set is compiled for a resin system, the data may be used to provide a technician the proper cure interval under certain conditions found in the field. For example, the technician may gather information in the field, including initial pipe temperature and initial resin temperature, and compare the information to the data collected under simulated conditions to determine the expected cure time of the resin system. Table III provides a schedule of cure intervals derived using the methods of this embodiment, where Polyester Resin B was mixed in the ratio specified by the manufacturer at an initial resin temperature of 65 Deg. Fahrenheit.

TABLE III

Cure schedule of Polyester Resin B having a mix ratio of ester base resin 97.8% by weight, BPO as a promoter 2% by weight, and DMA as a catalyst 0.2% by weight; an initial resin temperature of 65 Deg. Fahrenheit, and an ambient cure schedule of 80-90 minutes at 70 Deg. Fahrenheit

| Internal Pipe Temperature (Deg. Fahrenheit) | Cure Time (Min.) |
|---|---|
| 45 | 120 |
| 48 | 120 |
| 50 | 115 |
| 52 | 115 |
| 54 | 112 |
| 56 | 110 |
| 58 | 105 |
| 60 | 100 |
| 62 | 100 |
| 64 | 100 |
| 66 | 95 |
| 68 | 95 |
| 70 | 90 |

TABLE III-continued

Cure schedule of Polyester Resin B having a mix ratio of ester base resin 97.8% by weight, BPO as a promoter 2% by weight, and DMA as a catalyst 0.2% by weight; an initial resin temperature of 65 Deg. Fahrenheit, and an ambient cure schedule of 80-90 minutes at 70 Deg. Fahrenheit

| Internal Pipe Temperature (Deg. Fahrenheit) | Cure Time (Min.) |
|---|---|
| 72 | 90 |
| 74 | 85 |
| 76 | 85 |
| 78 | 80 |
| 80 | 80 |

The data presented in Table III includes the internal pipe temperature and the cure time. However, in order to increase accuracy, a decision matrix may be utilized that includes several additional parameters for a technician to consider, including the mix ratios, the cured hardness of the resin, and the initial resin temperature. Each of those additional parameters was held constant in deriving the data presented in Table III.

In the field, a technician may use an apparatus for determining the temperature of the internal aspects of a pipe or other underground structure in accordance with the present invention. The apparatus for determining the temperature of the internal aspects of a pipe or other underground structure is placed within a pipe or other underground structure to be rehabilitated and at least one temperature measurement is taken within the structure prior to or simultaneously with the installation of a liner. The temperature reading is compared to the data derived in a chart, such as Table III, and the technician is provided the expected cure time of the liner.

Figure 3:
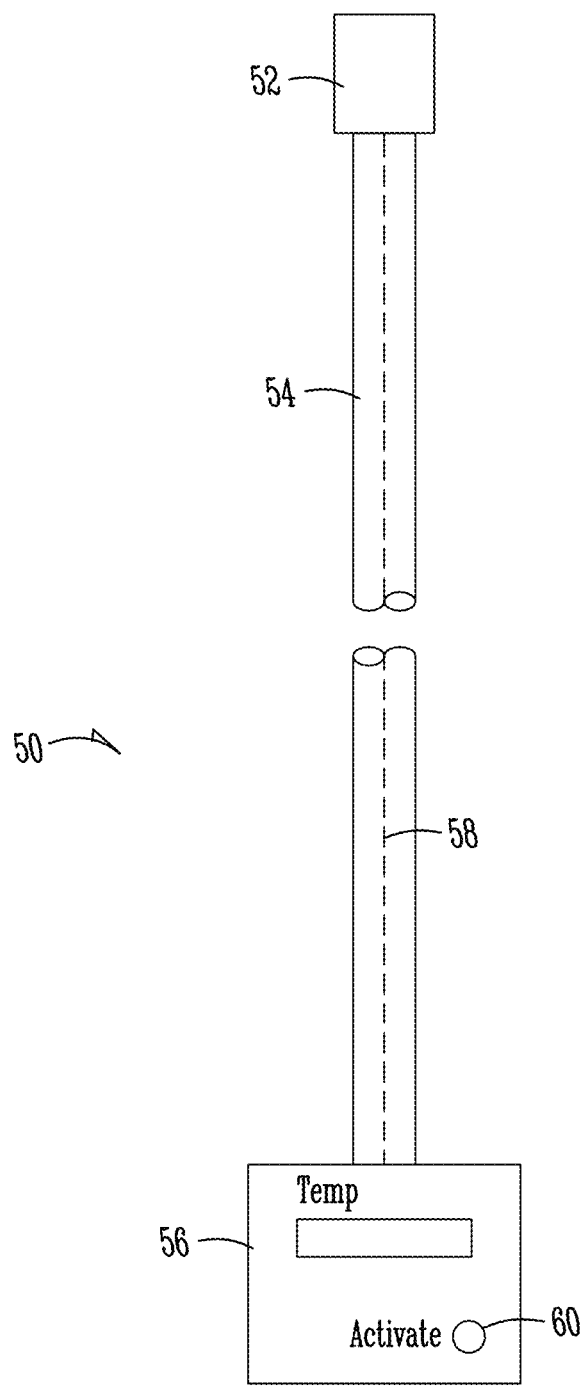
FIG. 3 is a perspective view of apparatus for determining the temperature of the internal aspects of a pipe or other underground structure in accordance with the present invention.

FIG. 3 is a depiction of an apparatus 50 for determining the temperature of the internal aspects of a pipe or other underground structure. The apparatus 50 includes a temperature probe 52, a portion 54 adapted to transport the temperature probe to a location remote from a user, and means for providing the temperature information to the user, depicted as a digital display 56 having a wire 58. The temperature probe 52 may be a liquid or gas thermometer, a thermal radiation thermometer, a laser thermometer, a pyrometer, a thermocouple, a resistance thermometer, or any other component capable of measuring the temperature of the conditions within a pipe or other underground structure.

In the embodiment depicted in FIG. 2, the temperature probe 52 is a thermal radiation thermometer, also called a "laser" thermometer. The portion 54 adapted to transport the temperature probe to a location remote to a user is depicted as a flexible fiberglass rod capable of bending through pipes or other passageways. The rod could be more than 50 feet in length. Alternatively, the member or portion 54 adapted to transport the temperature probe to a location remote to a user may be a robot, an unmanned aerial vehicle ("UAV"), a pipeline inspection gauge ("PIG"), a flexible reinforced conduit, a cable, or the like. Embodiments that include the use of a flexible conduit may be more than 500 feet in length and housed on a reel. The temperature probe 52 should be attached or otherwise connected to the member 54 adapted to transport the temperature probe 52 to a location remote to a user. However, since a user may be remote from the area where the temperature reading will take place, a means for providing the temperature information to the user may be utilized. The means for providing the temperature information to the user may include a camera, a wire, a wireless transmitter/receiver, a cellular phone, a tablet, a display, a terminal for viewing the temperature information, or a combination of the foregoing. In the depicted embodiment, the means for providing the temperature information to the user is a wire 58 that travels through a conduit within the fiberglass rod, connecting the temperature probe to the digital display 56 where the information is presented to the user.

The embodiment depicted in FIG. 2 further illustrates a trigger or button 60 connected to the digital display 56 that is configured to activate the temperature probe 52 and provide a reading to the user. Such a feature allows the user or operator to align the apparatus 50 prior to taking a temperature measurement and to conserve any power used by the temperature probe 52. Additionally, a small video camera and light (not pictured) may be placed adjacent the temperature probe 52 to enable an operator to visually determine the portion of the pipe where the temperature reading is taking place.

In operation, a user determines the temperature of the internal aspects of a pipe or other structure by providing an apparatus comprising a temperature probe, a member adapted to transport the temperature probe to a location remote to a user, and an apparatus to provide the temperature information to the user. The user places the temperature probe within a pipe by manipulating the member adapted to transport the temperature probe in a manner to reach a desired location within the pipe, obtains a temperature reading within the pipe, and views the reading on the apparatus or means for providing the temperature information to the user. Once the user obtains the temperature of the internal aspects of the pipe, the user compares the pipe temperature to data compiled using a soil cell that simulates in-ground conditions. From that comparison, the user determines a proper cure time or mix ratio of the resin system based on the in-ground temperature of the pipe and determines the expected cure time of a specified resin system.

In one embodiment, a user obtains a plurality of temperature measurements of the internal aspects of a pipe over the section of pipe to be rehabilitated with an ambient-cure resin system. In such a case, the user selects the lowest internal temperature observed and compares the pipe temperature to data compiled using a soil cell that simulates in-ground conditions to determine a cure schedule. If the temperature of a section of the pipe to be rehabilitated is significantly lower than other sections or the air within the pipe, then the portion of the pipe liner adjacent the cold portion of the pipe will be at risk of not curing completely. The method of the present invention provides at least the advantage of ensuring the resin will cure fully over the entire length of the pipe liner.

Figure 4:
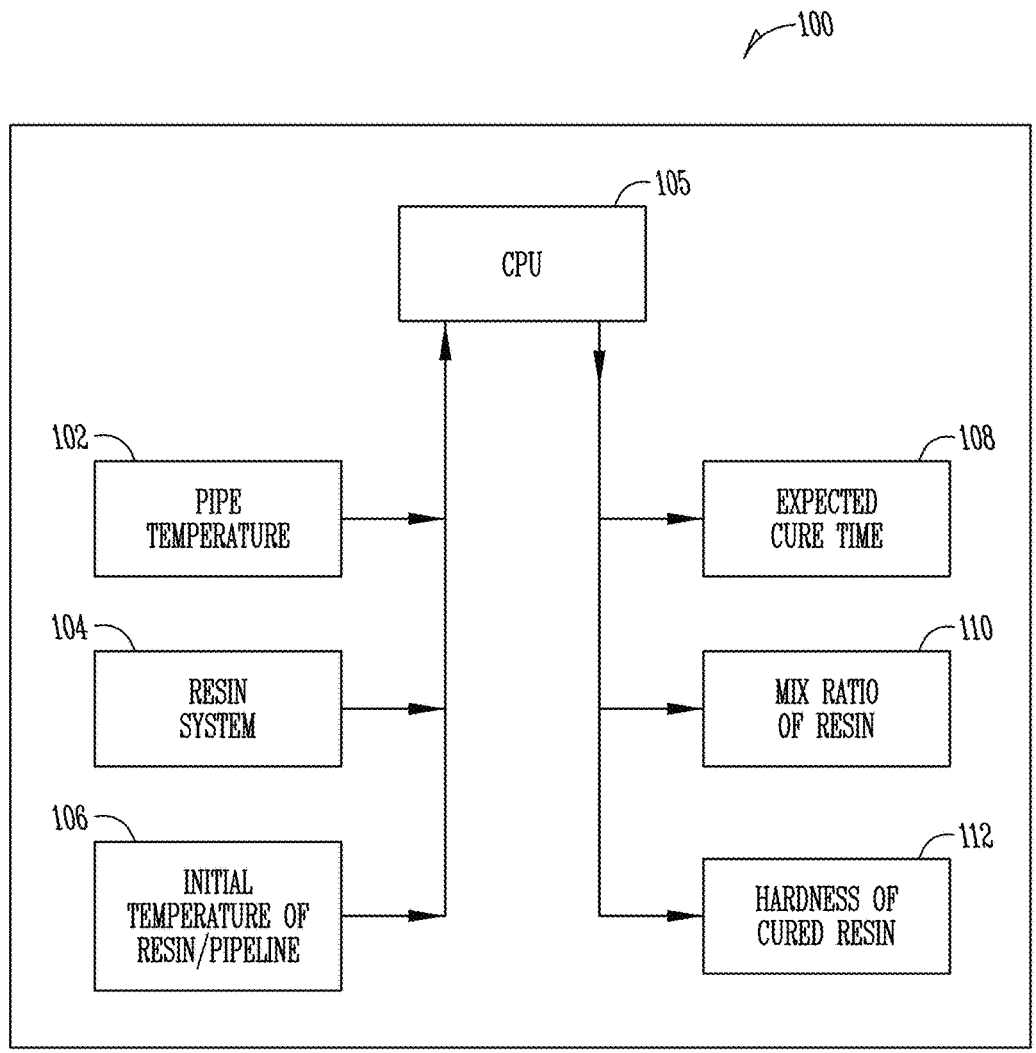
FIG. 4 is a block diagram of a computer program for providing input and output data for pipe lining according to the present invention.

An optional feature of the embodiments of the present invention is shown in FIG. 4, and includes the use of a computer program (CPU 105) stored in a recording medium to provide the expected cure time and/or mix ratio of a resin system to an end user. The data obtained from running soil cell tests on resin systems may be entered into the recording medium in a database or spreadsheet format. The computer program may include several functionalities, but at least should be capable of executing queries for information based on parameters entered by a user. The parameters may include internal pipe temperature 102, the resin system used 104, and the initial temperature of the resin or pipe liner 106. Once the parameters are entered into the computer program 105, the parameters are processed to provide the user with information including the expected cure time of the resin 108, the mix ratio of resin components 110, or the hardness of the cured resin 112. The recording medium of the computer program may be, without limitations, a handheld device, a smart phone, a Personal Digital Assistant (PDA), a mobile phone, a tablet, a computer notebook, a computer, a calculator with programming functionality, a data card, or a server. It is preferred to house the computer program on a server and allow users to remotely access the program via a network such as the internet. It should also be appreciated that other information may be entered into the program or unit 105, and additional output parameters may also be given by the program or unit 105.

The present invention has many attendant advantages. First, the embodiments of the present invention provide a solution to the problem of uncertain cure times for resin systems due to environmental conditions. Secondly, the embodiments of the present invention provide an apparatus for measuring the temperature of a pipe or underground structure where an operator does not have immediate access to the structure. Thirdly, the embodiments of the present invention provide methods for determining the proper cure interval of a resin system under various conditions for use with various lining methods.

It should be understood that various changes and modifications to the presently preferred embodiment described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A method for determining a cure interval for a resin system used in a lining operation, comprising:
    performing a plurality of tests under simulated conditions in a soil cell apparatus to obtain an expected cure time of a resin over a range of resin temperatures, wherein the soil cell apparatus includes a housing having a media with an aperture therein for receiving a pipe and a heat exchanger for adjusting a temperature of the soil cell for each of the plurality of tests; and
    obtaining an initial temperature reading of a structure to be lined;
    determining the cure interval of the resin system based on the initial temperature reading by comparing the initial temperature to the expected cure time for the initial temperature determined in the plurality of tests performed under simulated conditions;
    wherein the cure interval is the expected cure time of the resin.

2. The method of claim 1, wherein the lining operation is a cured-in-place pipelining operation.

3. The method of claim 1, wherein the structure to be lined is a sewer pipe.

4. The method of claim 1, wherein the resin system is an ambient-cure resin system.

5. The method of claim 1, wherein the initial temperature reading is obtained by an apparatus comprising:
    a temperature probe;
    a member adapted to transport the temperature probe to a location remote to a user; and
    device for providing the initial temperature reading to the user.

6. The method of claim 5, wherein the temperature probe comprises a thermal radiation thermometer.

7. The method of claim 5, wherein the member adapted to transport the temperature probe to a location remote to the user comprises a fiberglass rod.

8. The method of claim 5, wherein the device for providing the initial temperature reading to the user comprises a wire.

9. The method of claim 8, wherein the device for providing the initial temperature reading to the user further comprises a digital display.

10. The method of claim 1 wherein the media comprises at least one of sand, soil, water, rock, and clay.

11. A method of determining pipe lining characteristics for lining an underground structure, comprising: determining a temperature inside the underground structure, a type of resin used in the underground structure, and an initial temperature of the resin used; inputting the inside temperature, the type of resin used, and the initial resin temperature into a computer program on a computing device; and obtaining the pipe lining characteristics from the computer program based on the temperature inside the underground structure, the type of resin used, and the initial resin temperature; wherein the computer program comprises a set of data obtained by performing a plurality of tests under simulated conditions in a soil cell apparatus, wherein the soil cell apparatus includes a housing having a media and an aperture within the housing for receiving a pipe which is surrounded by the media, and a heat exchanger embedded within the media for adjusting a temperature of the pipe and the media during the plurality of tests.

12. The method of claim 11, wherein the pipe lining characteristics comprise an expected cure time of the resin, a mix ratio of resin components, or a hardness of the cured resin.

13. The method of claim 11, further comprising lining the underground structure according to the pipe lining characteristics from the computer program.

14. The method of claim 11 wherein the media comprises at least one of sand, soil, water, rock, and clay.

* * * * *